March 22, 1966 W. C. WETZEL 3,242,483
ELECTRO-MAGNETIC MOTOR AND FRAME MEMBER FOR HORNS
Filed Aug. 8, 1962 3 Sheets-Sheet 1

INVENTOR.
WILLIAM C. WETZEL
BY
Souther & Stoltenberg
ATTORNEYS

March 22, 1966   W. C. WETZEL   3,242,483
ELECTRO-MAGNETIC MOTOR AND FRAME MEMBER FOR HORNS
Filed Aug. 8, 1962   3 Sheets-Sheet 2
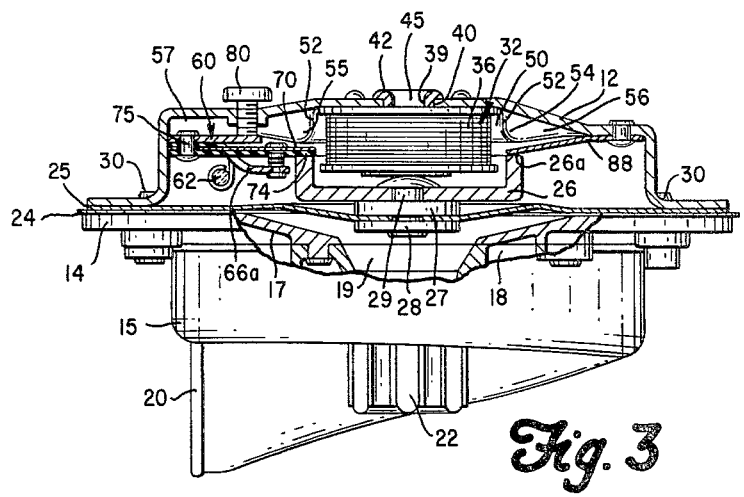
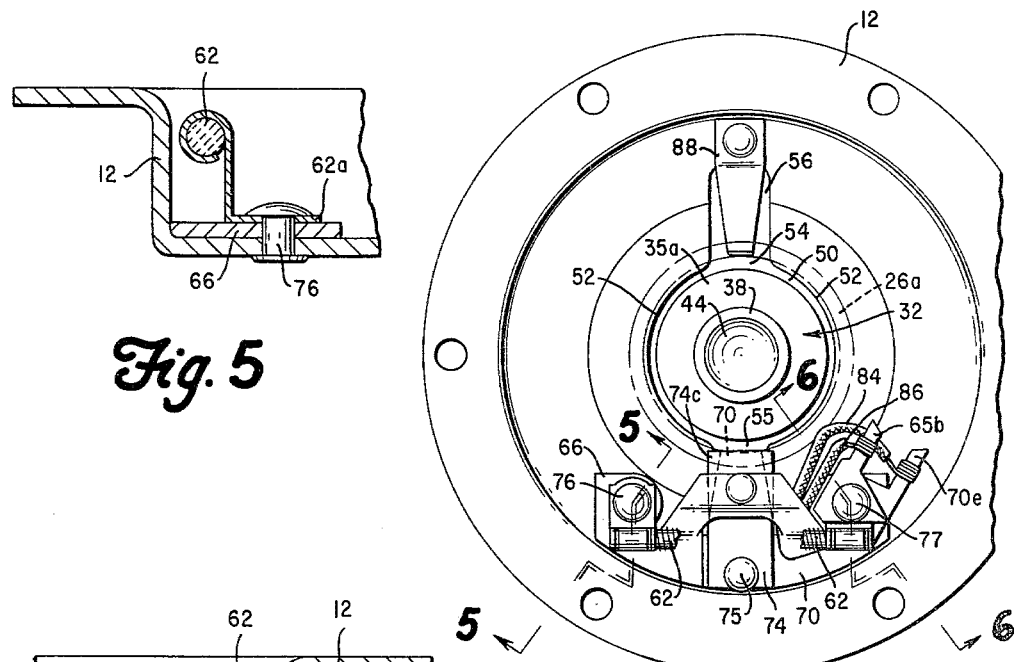
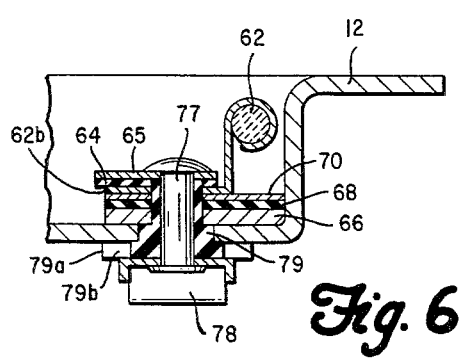
INVENTOR.
WILLIAM C. WETZEL
BY
Southern & Stoltenberg
ATTORNEYS March 22, 1966 W. C. WETZEL 3,242,483
ELECTRO-MAGNETIC MOTOR AND FRAME MEMBER FOR HORNS
Filed Aug. 8, 1962 3 Sheets-Sheet 3

INVENTOR.
WILLIAM C. WETZEL
BY
Souther & Stoltenberg
ATTORNEYS

United States Patent Office 3,242,483
Patented Mar. 22, 1966

3,242,483
ELECTRO-MAGNETIC MOTOR AND FRAME
MEMBER FOR HORNS
William C. Wetzel, Bay City, Mich., assignor to Eltra
Corporation, a corporation of Ohio
Filed Aug. 8, 1962, Ser. No. 215,751
5 Claims. (Cl. 340—391)

This invention relates to horns and more particularly to the general construction and related details of electro-magnetic vibratory horns for use on motor vehicles.

The invention contemplates the provision of a horn construction comprising a number of sub-assemblies constructed of fewer parts which are positioned in a cooperative arrangement in a horn housing. This results in simplified manufacturing procedures which also includes motor and circuit breaker adjustments for optimum operation in the final assembling operations, thereby providing reduced manufacturing costs while maintaining the quality demanded in competitive horn manufacturing.

The invention further includes the provision of a simplified universal mounting means for positioning a horn on a vehicle in that the mounting bracket can be attached to either the top or bottom of the horn and maintained in any one of a plurality of transverse angular positions with relation to the axis of the horn motor.

It is, therefore, a principal object of the invention to provide an electromagnetic horn which is simplified in construction and less critical in motor and circuit breaker adjustments at the time of manufacturing, thus inherently more economical to manufacture.

It is a further object of the invention to provide a frame construction for a horn with mounting means that will be more adaptable to meet the many mounting requirements for mounting the horn on the various makes and styles of motor vehicles.

In the drawings:

FIG. 3 is a side elevational view partly in section taken on line 3—3 of FIG. 2;

FIG. 4 is an inverted plan view of a housing member, partly broken away, showing a circuit breaker assembly mounted to the underside of the housing member;

FIG. 5 is a partial sectional view taken on line 5—5 of FIG. 4;

FIG. 6 is a partial sectional view taken on line 6—6 of FIG. 4;

Figure 1:
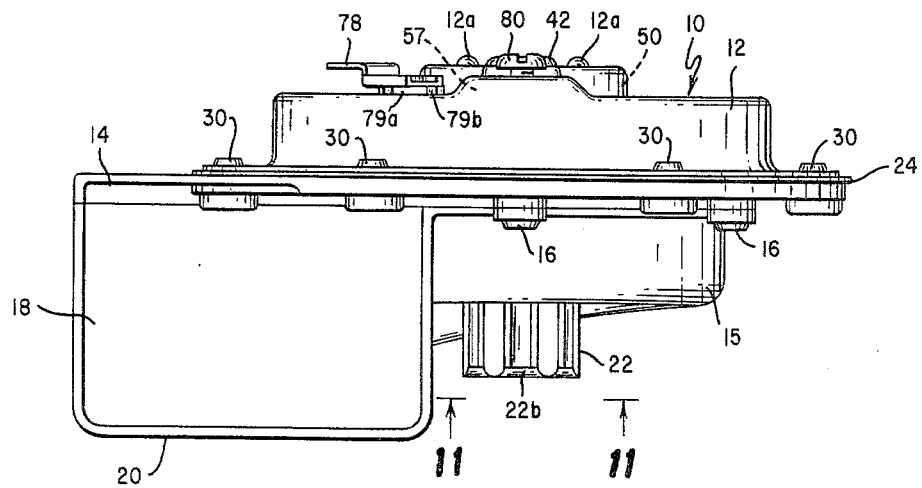
FIG. 1 is a front elevational view of a horn incorporating an embodiment of this invention.
Figure 2:
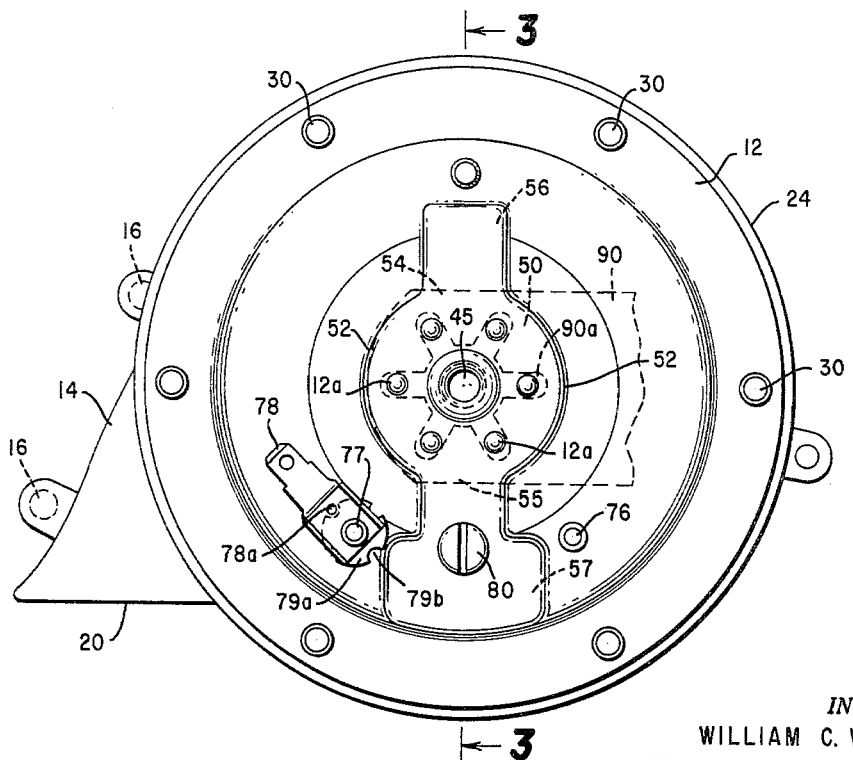
FIG. 2 is a top plan view of the horn.

Referring to the drawings, particularly FIGS. 1, 2 and 3, an electromagnetic horn assembly 10 is shown having three main frame members comprising an upper cup-shaped housing member 12, an intermediate face plate 14, and a lower trumpet member 15. The face plate 14 and the trumpet member 15 form a sound chamber sub-assembly that is permanently assembled with riveted studs 16, which are integral stud portions of the face plate 14. A lower surface 17 (FIG. 3) of the face plate is provided with a pre-formed spiral recess which cooperates with a similar pre-formed configuration in the trumpet member 15, when in sealed assembled relation, to form a spiral passage 18 providing a conventional resonating air column for the horn. The spiral passage 18 begins at a collapsible air chamber 19 formed between the upper side of the face plate 14 and a diaphragm 25 and terminates at an enlarged bell end 20 which has a truncated rectangular configuration as compared with a conventional bell.

A centrally located mounting post 22 integral with the cast trumpet member 15 projects downwardly from the lower surface of the trumpet directly below the air chamber 19, the post being positioned substantially in the center of the spiral configuration. The mounting post 22 is provided with radial flutes to facilitate the positioning of a mounting bracket thereon in a plurality of radial positions, the details of which will be further described hereinafter.

The horn is an air-note type having a diaphragm assembly which includes the conventional diaphragm member 25 cooperating with the face plate 14 to form the collapsible chamber 19. A cup-shaped armature 26 is attached to the vibrating diaphragm by a rivet 29 which cooperates also with a spacer member 27 positioned between the diaphragm and the armature, and a washer 28, to permanently hold the members together in assembled relation. The diaphragm assembly is positioned on the trumpet assembly with a central portion of the diaphragm 25 being directly over the air chamber 19. An annular sealing gasket 24 is provided between the diaphragm and the face plate 14 to seal the air chamber 19 in a conventional manner.

The housing member 12 is positioned over the diaphragm 25 and permanently secured to the diaphragm and the face plate and trumpet assembly by a plurality of rivets 30. Permanently mounted within the cup-shaped housing member 12 is a circuit breaker assembly (to be described in detail hereinafter), and an electromagnetic coil assembly 32. The coil assembly 32 (FIGS. 3 and 9) comprises a magnetic core member 34, a spool including an upper insulating disk 35, a lower insulating disk 35a, and a coil winding 36 of insulated magnet wire positioned between the disks. The disk 35a is positioned on a lower end of the magnetic core 34 on a reduced diameter to provide an annular shoulder 37 for the disk with the core being staked over the disk, as at 38 to hold the disk in position. The coil winding 36 and the upper disk 35 are positioned on the core and the core is then secured to the housing member 12 by an integral tubular portion 39, surrounding a counterbore 45 in the core, which projects thru a central aperture 40 in a well in the housing member and is rolled over as at 42.

The face of the coil core 34 is provided with a concave recess 44 in its lower end which provides a clearance for the rounded head portion of the rivet 29 in the diaphragm assembly when the diaphragm vibrates during the operation of the horn. The upper end of the core has the central counterbore 45 which provides an alternate horn mounting means to be described further hereinafter.

The coil assembly 32 is positioned in a central well 50 (FIGS. 2, 3 and 9) formed integrally in the base of the cup-shaped housing member 12 by providing two oppositely-disposed arcuate wall portions 52 struck-up from the base of the housing member 12 by segmental indentations. The wall portions 52 are vertically disposed and concentric with the axis of the coil 36, and positioned in a manner to cooperate with the lip of the flange 26a of the cup-shaped armature 26 mounted centrally on the diaphragm 25 as is best seen in FIG. 3. The vertical portion of the walls extend approximately to one-half the vertical dimension of the coil 36, and are provided with an upwardly extending segmental arcuate portion on the lip to concentrate the magnetic flux at its point of cooperating with the lip 26a of the cup-shaped armature 26. The arcuate wall portions 52 are separated and broken by openings 54 and 55 at diametrically opposed positions to provide air gaps in the circumferential direction whereby the eddy currents which are created in the vertical walls are substantially reduced in the magnetic circuits of which they form a part. The opening 54 forms the base of a wedge-shaped space 56 which tapers to merge with the main base of the cup. The opening 55 is conformed to provide an entranceway into a cubical space 57 to provide room for the mounting of a circuit breaker assembly. The wires which make electrical connection with the coil 36 enter the well 50 through the opening 55 in order to provide a minimum of interference with the vibrating armature.

Figure 7:
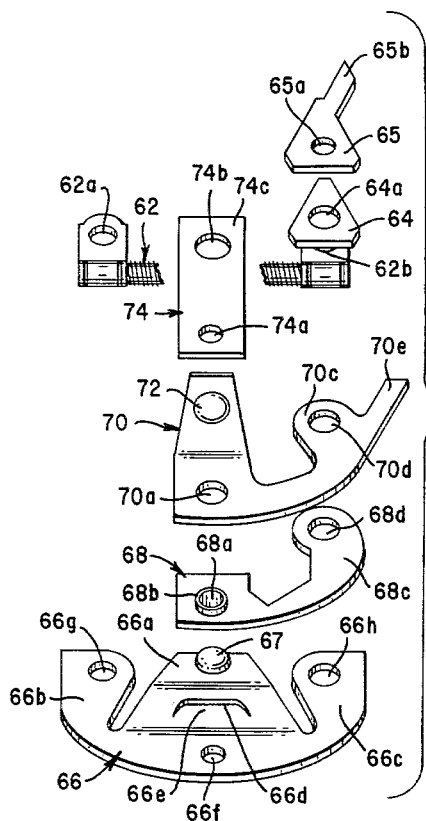
FIG. 7 is an exploded isometric view showing the various elements of the circuit breaker mechanism.
Figure 8:
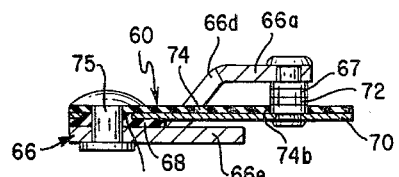
FIG. 8 is a sectional view of a sub-assembly of the circuit breaker.

The circuit breaker mounted in the cubical space 57, as shown in FIGS. 4–8, may be fabricated in part as a sub-assembly 60, as shown in FIG. 8, which is then assembled in position in the cup-shaped housing 12 with cooperating parts, all of which are shown in the exploded view in FIG. 7.

The sub-assembly 60 comprises a main base member 66 which is formed with a central element and two laterally extending wings or ears 66b and 66c, and a vibratory spring assembly 70 attached to the central portion of the main base member. The vibratory spring 70 also has a lateral projection 70c overlying the lateral projection 66c of the base member having an aperture 70d which aligns with an aperture 66h in the right ear of the base member for purposes which will appear hereinafter. In a similar manner, the vibratory spring 70 has an aperture 70a which aligns with an aperture 66f in the central element of the main base member, the two parts being insulated from each other by a plate of insulation 68 which is positioned between them having also a lateral projection 68c which is provided with an aperture 68d which aligns with the aperture 66h and 70d mentioned hereinbefore to be described further hereinafter. In a similar manner, the main portion of the insulating plate 68 is provided with an aperture 68a which aligns with apertures 70a and 66f, including an upstanding flange 68b on the insulating plate which projects into the aperture 70a as is best seen in FIG. 8. A second insulating plate 74 overlies the vibratory spring 70, being provided with an aperture 74a to align with apertures 70a, 68a and 66f.

A rivet 75 is provided to hold the parts in assembled relation so that the vibratory spring 70 projects through an aperture 66d formed in the main base member 66 so as to be positioned beneath a raised bridge portion 66a bent into parallel relation with the main base portion 66. Contact members 67 and 72 are positioned on the vibratory spring member 70 and the relatively-fixed bridge member 66a in an aligned cooperative relation as shown in the aforementioned figure. Both contact points are riveted to their respective supporting members as is well known in the art. The relatively-movable contact member 72 on the vibratory spring 70 projects through an aperture 74b in the insulating plate 74 which overlies the vibratory spring 70. The aperture 66d in the main base member 66 is preferably formed by lancing the central portion of the main body of the base member and thereafter bending the bridge member 66 upwardly and in parallel relation with the main base portion as is best seen in FIG. 8. The bridge member is essentially U-shaped in the conformation being integral with the main body 66 by attachment thereto at its ends as best seen in exploded view in FIG. 7. The main body member and the bridge member are so arranged that the vibratory spring 70 is slightly flexed to press the contact points 67 and 72 together, an adjusting device for varying this pressure and also an actuating means for the contact points will be further described hereinafter.

Referring again to FIG. 7, the lateral projection 70c of the vibratory spring is provided with a terminal ear 70e which projects beyond the position of the aperture 70d. The terminal lug 70e is provided for connecting the relatively movable contact point 72 in the electrical circuit as will be described further hereinafter. A second terminal piece 65 is provided which has a projecting terminal ear 65b, to which connecting wires of the electrical circuit are connected in the same manner as to the lug 70e, already described, the two lugs 65b and 70e being spaced as shown in FIG. 4 to provide better clearance for the connecting operation. The terminal piece 65 is provided with an aperture 65a which aligns with apertures 70d, 68d and 66h in the principal parts already described. Positioned below the terminal piece is an insulating plate 64 which is also provided with an aperture 64a to be placed in alignment with the stack already mentioned. Also included in the stack is one end of a resistance element 62 which is provided with terminal ears or flags having apertures 62a and 62b, the aperture 62b being adapted to cooperate with the stack which includes the lateral extending portions of the various parts of the circuit breaker. The aperture 62a in the left-hand ear (FIG. 7) of the resistance element aligns with the aperture 66g in the left-hand ear 66b of the main base member already described. The right-hand stack (FIG. 7) is shown in fully assembled relation in FIG. 6 where the parts are held in assembled relation by a rivet 77 which cooperates with the various apertures in the assembled parts including an external terminal 78. An insulating member 79 is provided to insulate all of the parts excepting the terminal piece 65 at the top end from the remaining portions of the stack except the external terminal 78. Insulating tube or sleeve 79 is provided with an integral flange 79a contacting the outer side of the casing of the horn, the flange having recesses 79b to cooperate with an indentation 78a (FIG. 2) in the external terminal 78 to allow the terminal to be placed in a plurality of adjusted positions on the horn for convenience in making external electrical connections.

On the opposite end of the main base member, or the left-end (FIG. 7), the terminal ear 62a is grounded to the main base member 66 and the horn frame 12 by a rivet 76 as is clearly shown in FIG. 5. This connects the resistance element in parallel with the contact points 67 and 72 to reduce arcing.

The circuit breaker assembly is positioned in the housing 12 as shown in FIGS. 3 and 4 so that the projecting end portion 74c of the insulating member 74 overlying the spring 70 contacts the edge 26a of the armature 26 which insulates the contact carrying spring member 70 from the armature. During the horn operation, the vibratory armature 26 during its power stroke will act against the bias of the spring member 70 to cause the contacts 67 and 72 to open thus breaking the power circuit to the coil winding 36 which is connected through leads 84 and 86 (FIG. 4) to the circuit breaker by being wrapped on terminal tab 70e and 65b respectively.

As the armature contacts the spring 70 the counteracting force of the spring tends to tip the armature and cause the armature to operate in an oblique plane. To counter-act the force of the spring 70 on the armature and insure concentric operation of the armature with relation to the axis of the horn a counter-balancing spring 88 (FIG. 3) is provided in the housing assembly. The spring 88 is riveted at one end to the base of the cup-shaped housing 12 and is so positioned in the horn assembly that a downwardly bent portion of the spring contacts the edge 26a of the armature at a point diametrically opposite the contacting point of the spring 70 thus balancing the forces acting on the armature.

A self-locking adjustment screw 80 is provided which is threaded in the housing 12 and positioned to bear against a projecting portion 66e of base member 66 of the circuit breaker assembly. A gap adjustment is thus provided by changing the position of relatively-fixed contact 67 mounted on member 66 with relation to the position of movable contact 72 mounted on spring member 70 which is maintained in a given position by contact with the edge 26a of the armature 26.

Figure 9:
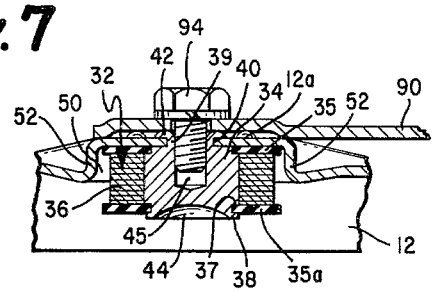
FIG. 9 is a sectional view, partly broken away, showing an electromagnetic coil assembly.
Figure 10:
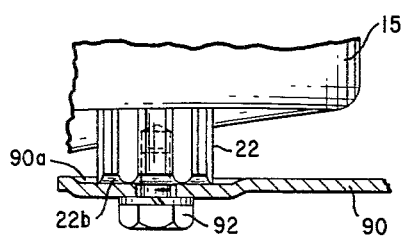
FIG. 10 is an elevational view partly in section and partly broken away showing a mounting bracket attached to a mounting post of the horn.
Figure 11:
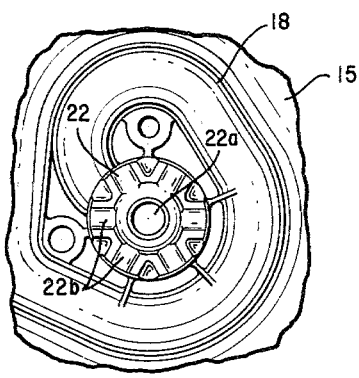
FIG. 11 is a partial bottom plan view taken on line 11—11 of FIG. 1 showing the horn mounting post.
Figure 12:
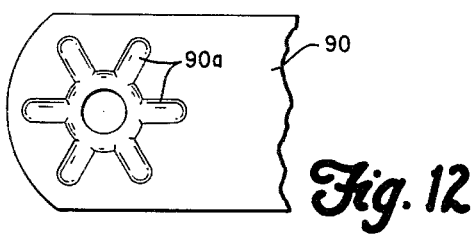
FIG. 12 is a plan view of a portion of a mounting bracket to be used on the horn.

The horn mounting post 22 on the resonator casting (FIGS. 10 and 11) is provided with a central cavity 22a for attaching a mounting bracket 90 thereto (only a portion of which is shown in FIGS. 10 and 12) with a self-threading bolt 92. The cooperating end of the mounting bracket 90 is provided with a plurality of indentations, 90a, which fit into cooperating ridge portions 22b formed on the face end of the mounting post 22. This provides a means of mounting the horn on the bracket in a plurality of positions to accommodate to a mounting requirement for a given make of vehicle. It may also be desirable to attach the mounting bracket to the opposite side of the horn as shown in FIGS. 3 and 9. Similar attaching means is provided in bolt 94 which is self-threaded into the counterbore 45 in the coil core 34. The bracket 90 is positioned radially on the housing 12 by a plurality of locating detents 12a which cooperate with the indentations 90a formed in the bracket 90.

What is claimed is:

1. In a horn, a cup-shaped housing of magnetic material having an outwardly-extending flange on the lip thereof, a vibratile diaphragm attached to the flange to cover the cup-shaped housing, a sound chamber member on the opposite side of the diaphragm to cooperate therewith to form a resonating air column, means to clamp the housing and sound chamber member together at the flange to provide a horn construction, a well in the base of the cup-shaped housing having portions extending upwardly therefrom to form at least two arcuate sections, an electromagnet mounted in the well having a magnetic core to extend above the said sections, a cup-shaped armature of magnetic material affixed in inverted position to the central portion of the vibratile diaphragm to cooperate magnetically with the core of the electromagnet and the arcuate sections of the housing base to complete a magnetic circuit including an air gap between the armature of the electromagnet and the arcuate sections whereby the cup-shaped armature is attracted toward the electromagnet when the electromagnet is energized to tend to close the air gaps and deflect the vibratile diaphragm, and circuit breaker means attached to the housing adjacent the armature to be actuated by the lip of the cup-shaped armature to open the power circuit through the electromagnet when the vibratile diaphragm has been deflected a predetermined amount to cause the horn to operate.

2. In a horn having an electromagnetic motor and a vibratory diaphragm, a cup-shaped housing member of magnetic material having means to support the diaphragm, a central well in the bottom of the cup-shaped housing member, an electromagnet coil assembly including a magnetic core positioned in the well formed in the housing member so that the magnetic core extends above the bottom, a cup-shaped armature secured to the vibratory diaphragm in inverted position with its bottom portion cooperating with the upwardly extending core of the electromagnet coil assembly and said cup-shaped armature having a lip portion cooperating with the bottom of the housing to form a magnetic circuit operable to vibrate the diaphragm, the annular wall of said cup-shaped armature encircling a portion of the electromagnet coil assembly, a circuit breaker for the motor positioned in the housing member adjacent the annular wall of the armature, a portion of the edge of said annular wall of the cup-shaped armature cooperating with a movable portion of the circuit breaker member to make and break the electrical power circuit to the electromagnetic coil, and a single circuit breaker adjustment means to modify the operation of a circuit breaker mechanism.

3. In a horn having an electromagnetic motor and a vibratory diaphragm, a cup-shaped housing member of magnetic material having a central circular well with raised lip portions, an electromagnet coil assembly including a magnetic core positioned in the well formed in the housing member to extend above the lip portions, a cup-shaped armature of magnetic material secured in inverted position to the vibratory diaphragm to cooperate with the core of the electromagnet coil assembly and the raised lip of the housing well in a magnetic relation to vibrate the diaphragm, the annular wall of said cup-shaped armature encircling the portion of the electromagnet coil extending above the raised lip portion of the housing, a circuit breaker for the motor positioned in the housing member laterally of the central well, a portion of the edge of said annular wall of the cup-shaped armature cooperating with a movable portion of the circuit breaker member to make and break the electrical power circuit to the electromagnetic coil, and a single circuit breaker adjustment means to modify the operation of a circuit breaker mechanism.

4. In a horn, a cup-shaped housing of magnetic material having an outwardly-extending flange on the lip thereof, a vibratile diaphragm attached to the flange to cover the cup-shaped housing, a sound chamber member on the opposite side of the diaphragm to cooperate therewith to form a resonating air column, means to clamp the housing and sound chamber member together at the flange to provide a horn construction, a well in the base of the cup-shaped housing formed by raised indentations in the base to extend portions upwardly therefrom to form at least two arcuate sections extending toward the diaphragm, an electromagnet mounted in the well having a magnetic core to extend toward the diaphragm above the said sections, a cup-shaped armature of magnetic material affixed in inverted position to the central portion of the vibratile diaphragm to cooperate magnetically with the core and the sections to complete a magnetic circuit including an air gap between portions of the armature and the core of the electromagnet and the arcuate raised sections in the housing whereby the armature is attracted toward the core when the electromagnet is energized to tend to close the air gap and deflect the vibratile diaphragm, and circuit breaker means mounted in the housing adjacent the armature to be actuated by the lip of the armature to open the power circuit through the electromagnet when the vibratile diaphragm has been deflected a predetermined amount to cause the horn to operate.

5. In a horn, a cup-shaped housing of magnetic material having an outwardly-extending flange on the lip thereof, a vibratile diaphragm attached to the flange to cover the cup-shaped housing, a resonator member on the opposite side of the diaphragm to cooperate therewith to form a resonating air column, means to clamp the housing and resonator member together at the flange to provide a horn construction, a well in the base of the cup-shaped housing formed by raised segmental indentations in the base to extend portions upwardly therefrom into the housing to form arcuate sections having projecting lips, an electromagnet mounted in the well having a magnetic core to extend above the projecting lips of said sections, a cup-shaped armature of magnetic material affixed in inverted position to the central portion of the vibratile diaphragm, the flange of which cooperates magnetically with said projecting lips of the arcuate sections, a magnetic circuit being formed including air gaps between the core of the electromagnet and the base of the armature and the flange with the lips of the arcuate sections whereby the armature is attracted toward the core when the electromagnet is energized to tend to close the air gaps and deflect the vibratile diaphragm, and circuit breaker means mounted in the housing adjacent the armature to be actuated by the flange on the armature to open the power circuit through the electromagnet when the vibratile diaphragm has been deflected a predetermined amount to cause the horn to operate.

References Cited by the Examiner

UNITED STATES PATENTS

| | | | |
|---|---|---|---|
| 1,164,538 | 12/1915 | Madden | 248—291 X |
| 1,995,656 | 3/1935 | Stout | 248—291 X |
| 2,700,761 | 1/1955 | White et al. | 340—388 |
| 2,803,004 | 8/1957 | White | 340—391 |
| 2,941,198 | 6/1960 | Turney | 340—388 |

NEIL C. READ, *Primary Examiner.*